United States Patent
Burkhardt

(10) Patent No.: US 10,309,805 B2
(45) Date of Patent: Jun. 4, 2019

(54) ABSOLUTE MEASURING LENGTH MEASURING SYSTEM AND METHOD FOR ITS OPERATION

(71) Applicant: Balluff GmbH, Neuhausen a.d.F. (DE)

(72) Inventor: Thomas Burkhardt, Zell (DE)

(73) Assignee: Balluff GmbH, Neuhausen a.d.F. (DE)

( * ) Notice: Subject to any disclaimer, the term of this patent is extended or adjusted under 35 U.S.C. 154(b) by 330 days.

(21) Appl. No.: 15/372,478

(22) Filed: Dec. 8, 2016

(65) Prior Publication Data

US 2017/0167896 A1 Jun. 15, 2017

(30) Foreign Application Priority Data

Dec. 9, 2015 (DE) .......................... 10 2015 121 474

(51) Int. Cl.
*G01D 5/245* (2006.01)
*G01D 5/249* (2006.01)

(52) U.S. Cl.
CPC ......... *G01D 5/2497* (2013.01); *G01D 5/2454* (2013.01); *G01D 5/2455* (2013.01); *G01D 5/2495* (2013.01)

(58) Field of Classification Search
CPC .... G01D 5/14; G01D 5/2455; G01D 5/24438; G01D 5/2457; G01D 3/00; G01D 5/00; G01D 5/145; G01D 5/2495; G01D 5/2497
USPC .......................................................... 33/701
See application file for complete search history.

(56) References Cited

U.S. PATENT DOCUMENTS

| 4,965,503 A * | 10/1990 | Watanabe ............ G01D 5/2455 318/671 |
| 5,279,044 A * | 1/1994 | Bremer ................ G01D 5/2495 33/706 |
| 6,760,682 B1 | 7/2004 | Schwabe |
| 8,020,310 B2 | 9/2011 | Finkler |
| 8,309,906 B2 * | 11/2012 | Kapner .............. G01D 5/24476 250/231.16 |
| 9,810,554 B2 * | 11/2017 | Oberhauser ........ G01D 5/34792 |
| 9,976,878 B2 * | 5/2018 | Burkhardt ................ G01D 5/14 |

(Continued)

FOREIGN PATENT DOCUMENTS

| DE | 196 43 538 A1 | 4/1998 |
| DE | 10230471 A1 | 1/2004 |

(Continued)

OTHER PUBLICATIONS

European Search Report in Application No. 16202697.5 dated Apr. 26, 2017 with English Translation of relevant parts.

(Continued)

*Primary Examiner* — Yaritza Guadalupe-McCall
(74) *Attorney, Agent, or Firm* — Collard & Roe, P.C.

(57) ABSTRACT

In a length or position measuring system which has an at least locally substantially linear measuring gauge and at least one sensor able to be moved relative to the measuring gauge wherein the measuring gauge includes an incremental track and at least one absolute track and wherein the incremental track and the at least one absolute track have pole pairs arranged in the longitudinal direction of the measuring gauge, it is provided in particular that at least one pole pair of the absolute track is phase-shifted relative to a corresponding pole pair of the incremental track.

9 Claims, 3 Drawing Sheets

(56) References Cited

U.S. PATENT DOCUMENTS

| | | | | |
|---|---|---|---|---|
| 2007/0074416 A1* | 4/2007 | Reusing | ............... | G01D 5/2455 |
| | | | | 33/706 |
| 2007/0120713 A1* | 5/2007 | Hayashi | ............... | G01D 5/2454 |
| | | | | 341/51 |
| 2008/0315076 A1* | 12/2008 | Kusano | ................ | G01D 5/2455 |
| | | | | 250/231.1 |
| 2009/0161121 A1* | 6/2009 | Oberhauser | ........ | G01D 5/34792 |
| | | | | 356/617 |
| 2016/0102998 A1* | 4/2016 | Romer | ................. | G01D 5/2415 |
| | | | | 324/207.14 |
| 2017/0167896 A1* | 6/2017 | Burkhardt | ............ | G01D 5/2497 |
| 2017/0184423 A1* | 6/2017 | Burkhardt | ................ | G01D 5/14 |
| 2018/0364068 A1* | 12/2018 | Hsiao | ................... | G01D 5/2458 |

FOREIGN PATENT DOCUMENTS

| | | |
|---|---|---|
| DE | 102006048628 A1 | 4/2008 |
| EP | 1770373 A1 | 4/2007 |
| EP | 1980824 A1 | 10/2008 |
| WO | 01/09568 A1 | 2/2001 |

OTHER PUBLICATIONS

German Office Action dated Aug. 23, 2016 in German Application No. 10 2015 121 474.1 with English translation of relevant parts.

\* cited by examiner

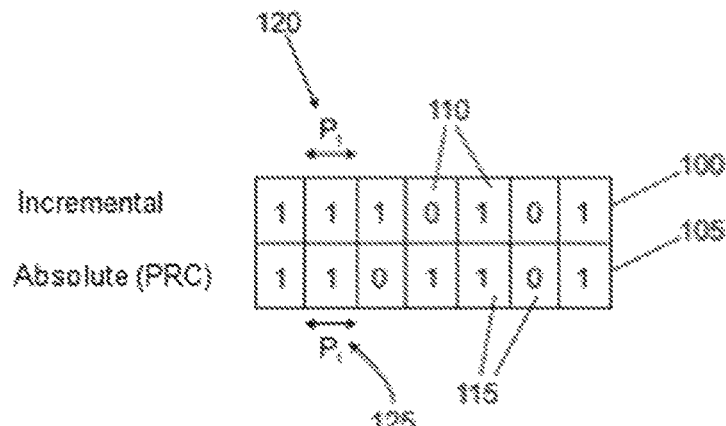
Fig. 1 (SdT)
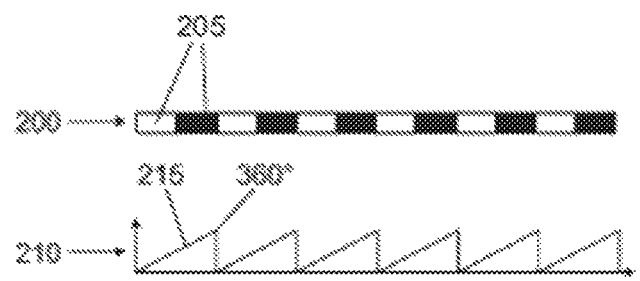
Fig. 2 (SdT)

ABSOLUTE MEASURING LENGTH MEASURING SYSTEM AND METHOD FOR ITS OPERATION

CROSS REFERENCE TO RELATED APPLICATIONS

Applicant claims priority under 35 U.S.C. § 119 of German Application No. 10 2015 121 474.1 filed Dec. 9, 2015, the disclosure of which is incorporated by reference.

BACKGROUND OF THE INVENTION

1. Field of the Invention

The invention relates to an absolute length measuring system or position measuring system having a preferably magnetically coded measuring gauge having an incremental track and at least one absolute track, and to a method for operating such a length or position measuring system, according to the type of the respective independent claims.

2. Description of the Related Art

Incremental Measuring Systems

Magnetic strip length measuring systems have become known in the field of measuring technology, in which a sensor head is moved across a measuring gauge (incremental track) that is periodically magnetized with changing polarity. Ideally, a sine-shaped and cosine-shaped sensor signal is generated in the sensor head or magnetic field sensor by the movement ("incremental sensor"). Depending on the magnetic measuring principle, the signal course repeats itself in sensor head with each pole of the measuring gauge (e.g. in GMR or AMR sensors which measure the square of the magnetic flow density $B^2$) or with each pole pair of the measuring gauge (e.g. in Hall effect sensors which provide an output voltage that is proportional to the product of the magnetic field strength and current). The position determination on said incremental track takes place in a conventional manner, e.g. by means of trigonometric functions.
Absolute Measuring Systems with Numerous Tracks There are numerous tracks on a measuring gauge. In addition to the incremental track of the incremental sensor, in an absolute measuring system, a sensor head contains at least one absolute sensor in order to sense one or more absolute tracks. Both the incremental sensor and the absolute sensor are thereby usually arranged in one single sensor head housing. The incremental position specifies or feeds back the position of the sensor or sensor head within a pole or pole pair (depending on physical measuring principles). The absolute position can be calculated using the following algorithm:

position (absolute)=position (in the pole)+pole number*pole width

To determine the pole number, a digital pseudo-random-coded (=PRC) track having logical values 0 and 1 corresponding to the N and S poles is usually used.

It emerges from WO 01/09568 that, in addition to said individual poles of a measuring gauge, pole pairs in the form of a so-called "invented code word" are also used or assessed. Said coding of logical values thus does not take place by one single pole, in a magnetic measuring system of the N pole or the S pole, but rather by at least two poles combined respectively in said absolute track in the measuring direction. In this way, such a pole pair has double the pole width of the incremental track, whereby a logical value is formed by the pole sequence N-S or the amended pole sequence S-N. The advantage of this arrangement of pole pairs is that with a transition of a logical '0' to a logical '1' or from a logical '1' to a logical '0', two adjacent, concordant poles emerge. These concordant poles with double the pole width can be better sensed because of the doubling of field strength than poles with only simple pole width. In particular, the air gap in such a length measuring system can thus be increased.

SUMMARY OF THE INVENTION

The object of the invention is to state a length or position measuring system related here, and a method for its use, with which the number of sensors required to evaluate the PRC track is reduced. Thus, the length of a PRC sensor array formed from the sensors for evaluating the PRC track is also shortened and thus also the housing length and production costs.

The approaches known from prior art require that the poles of an incremental track related here and an absolute track be arranged or aligned against each other to preserve their phases and phase fidelity. Only one bit ever emerges with each of these digital sensors.

However, the concept of the present invention is to shift the phases of the incremental track and the absolute track in the measuring direction or in the longitudinal direction of said measuring gauge against each other in such a way that a phase coding of the absolute track is possible relative to the incremental track. In this way, the number of measured values detected per sensor can be increased effectively by way of an "analogising", in fact from said two logical values (0 and 1) to e.g. five effectively analogously quantized values. Thus, with n sensors, not only $2^n$ poles can be detected, but in this example $5^n$ poles. Thus, the measurable length increases or the number of sensors reduces and thus the length of the PRC sensor array becomes shorter.

In general terms, $m^n$ values can be detected with m logical values corresponding to respective angle differences and with n sensors such that n digits can be connected, whereby $m^n$ values are able to be depicted in total.

The suggested concept provides the following advantages in comparison to purely digital codes on the basis of individual poles. In comparison to binary coding, fewer sensors are required for the same measuring length, from which a cost advantage emerges and in turn the possibility of implementing a length measuring system in a shorter housing. In addition, a more robust measuring system in comparison to prior art emerges, since the signal course is able to be measured more precisely and is not only recognized digitally. This is because more of said steps per digit or a higher number of logical intermediate values can thereby be implemented.

In addition, it should be noted that a higher number of steps per digit advantageously necessitates fewer sensors for the absolute track. In addition, the signal quality is independent to the distance between the measuring body and the sensor as far as possible because of the possibility of coding via pole pairs.

In a length or position measuring system related here, which has an at least locally substantially linear measuring gauge and at least one sensor able to be moved relative to the measuring gauge, wherein the measuring gauge comprises an incremental track and at least one absolute track and wherein the incremental track and the at least one absolute track have poles or pole pairs arranged in the longitudinal direction of the measuring gauge, it is thus in particular suggested according to the invention that pole pairs of the absolute track are phase-shifted relative to corresponding pole pairs of the incremental track or pole pairs opposite the measuring gauge, transverse to the longitudinal direction to enable said analogous or logical incrementation.

It should further be noted that said substantially linear measuring gauge can also be formed by an annular or partially annular measuring gauge, wherein the measuring gauge is then formed to be at least locally linear.

According to a preferred embodiment, n different absolute phase relations of a pole pair can be depicted in terms of an incremental track by the phase shift according to the invention, wherein e.g. n=4. In these n phase relations, relative shifts, compared to pole pairs of the incremental track, with angle differences of between 0° and 360° arise, by means of which corresponding logical values 1, 2, etc. can be formed. If n=4, the angle differences amount to 0°, 90°, 180° and 270° and the logical values to '0', '1', '2', and '3' accordingly.

Furthermore it can be provided that transition values or transition courses of the angle differences between two adjacent, differing logical values are removed from the evaluation of the logical values, i.e. are excluded or disregarded in the evaluation.

In order to remove said courses of angle differences from the evaluation of the logical values, at least two absolute sensors for each pole pair or logical digit can be arranged, which are arranged to be mechanically shifted, e.g. shifted by 180°. Each absolute sensor must be able to detect the phase relation to the incremental track. In this way, each of these sensors can be formed either from two individual sensors arranged in different places, which evaluate the amplitude, or from a sensor chip arranged at a site, said sensor chip determining the phase of a preferably two dimensional magnetic field with two differently aligned sensors.

An increment sensor thus initially detects the position within a pole pair, which is divided into several regions, e.g. four quadrants, for the purposes of the evaluation. If, in said example, the increment sensor is located in a first quadrant or in a fourth quadrant of the respective pole pair, the second absolute sensor is used for the evaluation. However, if the increment sensor is located in a second quadrant or in a third quadrant, the first absolute sensor is used for the evaluation. With this approach, the invalid region between the pole pairs can thus be inexpensively though still effectively blanked out.

The invention also relates to a method for operating a length or position measuring system related here, with which it is particularly provided that the at least double incremented logical values are detected or sensed.

A length or position measuring system according to the invention and the method for operating it according to the invention enable a more exact and reliable detection of an absolute position of a sensor concerned here, since it is only angles, and no longer, as in prior art, binarily digitalized amplitude values that are compared to each other. Thus, a significantly improved signal/noise ratio arises.

The invention can not only be applied accordingly in magnetic measuring systems, but also in optical, capacitive, inductive or other measuring or operating principles, as long as the respective sensor or sensor head has a finite expansion or size in the pole direction.

BRIEF DESCRIPTION OF THE DRAWINGS

FIG. 1 shows a measuring gauge of a length measuring system according to prior art.

FIG. 2 shows an incremental track having corresponding angles detected by an incremental sensor according to prior art.

DETAILED DESCRIPTION OF PREFERRED EMBODIMENTS

Figure 3:
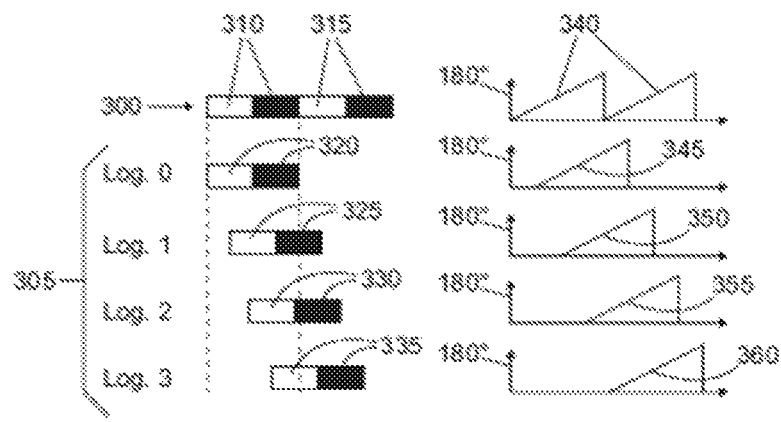
FIG. 3 shows a phase coding according to the invention, carried out in for example four steps relative to an incremental track, in fact with the angles shown in FIG. 2.

In FIG. 1, a conventional linear measuring gauge of a magnetic tape length measuring system (BML) with an incremental track 100 and a pseudo-random coded (PRC) absolute track 105 connected fixedly or immovably to the incremental track 100 is schematically depicted. The incremental track 100 has varyingly binarily coded poles 110 and the absolute track 105 has similarly binarily coded poles 115. Both the absolute track 105 and the incremental track 100 have a respectively concordant pole width 'P1' 120, 125.

Along with the conventional application scenarios with a substantially linear measuring section, such a measuring gauge 100, 105 can also be arranged on the circumference of a shaft, e.g. a drive shaft of a wind turbine or similar which is not shown. The BML thus serves to monitor or maintain the wind turbine if the position of the drive shaft has to be precisely detected.

The angle detected by the incremental sensor changes in each pole or pole pair 205, as is known in itself, from 0° to 360° (reference numeral 215). This is schematically depicted in FIG. 2 by means of an incremental track 200 shown there, wherein said corresponding angle courses 210 across numerous pole pairs are also depicted.

As already mentioned, the coding of an absolute track takes place according to the concept according to the invention by a phase shift of the poles of the absolute track relative to the poles of the incremental track. This is shown by means of an example by four increments in FIG. 3, wherein four different absolute phase relations 305 of a pole pair 320, 325, 330, 335 are depicted in relation to an incremental track 300 with shown pole pairs 310, 315. The shown logical values '0', '1', '2' and '3' correspond to the four phase relations with emerging relative phase shifts of 0°, 90°, 180° and 270° in comparison to the pole pairs 310, 315 of the incremental track 300.

It should thus be noted here that in general in the case of implementation with n analogue sensors for reading m-fold analogously quantized steps, $x=m^n$ values or poles can clearly be identified. The number of sensors is thus advantageously reduced compared to an implementation known from prior art with two (binary) logical values, i.e. m=2. In this way, when m=5 values and four sensors for example, $5^4=625$ poles can clearly be recognized or when m=2 (according to prior art) with four sensors, $2^4=16$ poles can clearly be recognized. In order to be able to clearly recognize 625 poles with prior art, ten sensors would be required since $2^{10}=1024$. Thus, for example, nine sensors would not suffice. For these reasons, a considerable cost advantage and a considerable construction size advantage of the invention emerge, since only four instead of ten sensors are necessary.

On the right side of FIG. 3, the angle courses 345-360 corresponding to the phase relations 305 are depicted, namely the emerging angle course 340 corresponding to the course 215 already shown in FIG. 2 and the respective angle courses 345, 350, 355, 360 of the phase shifted 305 absolute tracks.

Figure 4:
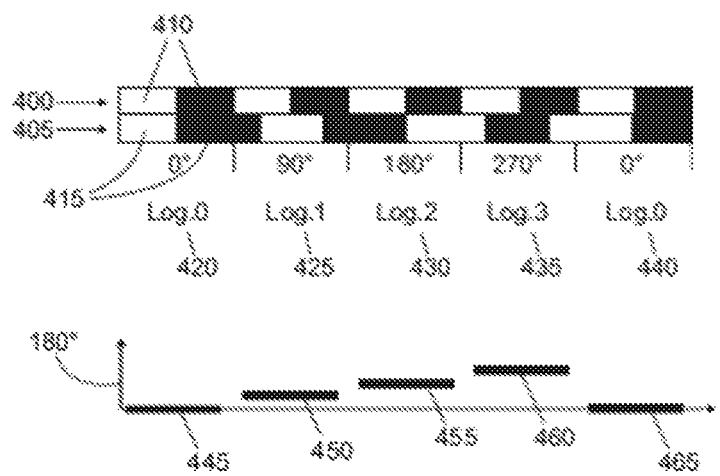
FIG. 4 shows a section of a measuring gauge formed according to the invention of a length measuring system, in fact having a phase coding having four different phase values, for example.

In the section depicted in FIG. 4 of a measuring gauge 400, 405 constructed according to the invention with an incremental track 400 with pole pairs 410 and an absolute track 405 connected mechanically immovably to the incremental track 400 with pole pairs 415 has four logical increments 420, 425, 430, 435 in the present exemplary embodiment (wherein the reference numeral 440 again corresponds to a logical '0'), which are formed one at a time by a respectively opposing pole pair of the incremental track 400 in comparison to corresponding or transverse to the longitudinal direction of the measuring gauge 400, 405 with an absolute track phase shifted with angles of 0°, 90°, 180° and 270°. Thus the four increments 305 already shown in FIG. 3 have been converted in the absolute track 405.

It should be noted that a logical value is herein defined which coincidentally, in the present example, has the value '01230'. Thus any combination of such numbers, e.g. ' . . . 1032302 . . . ' is possible. Such a coding is located on the entire measuring gauge and cannot be repeated across the length of the measuring gauge for reasons of clarity, which incidentally corresponds to the principles of said PRC code.

In the lower part of FIG. 4, the angle difference measured in the longitudinal direction of the measuring gauge 400, 405 between the incremental track 400 and the absolute track 405 is indicated. The angle difference changes according to said four increments 445, 450, 455, 460 from the 0° value to the 270° value in order to then start again at the 0° value (corresponding to reference numeral 465).

It should be noted that with typical relative dimensions of a measuring gauge with a pole width of 20 mm or 10 mm shown in FIG. 4, the width of the respective tracks amount to around 10 mm or 5 mm. Here, the correlation that the larger the required air gap is, the larger the pole width and the width of the measuring gauge must be, applies.

Within a pole pair 410 of the incremental track 400, the angle difference between the incremental track 400 and the absolute track 405 is substantially constant. In the region of the conversion of the angle difference from one logical value to a different (adjacent) logical value, e.g. from the logical value '1' 425 to the logical value '2' 430, the respective underlying logical values can be deduced relatively poorly from the corresponding angle difference signals 450, 455. Therefore two sensors are used for each digit, as can be seen in FIG. 5.

Figure 5:
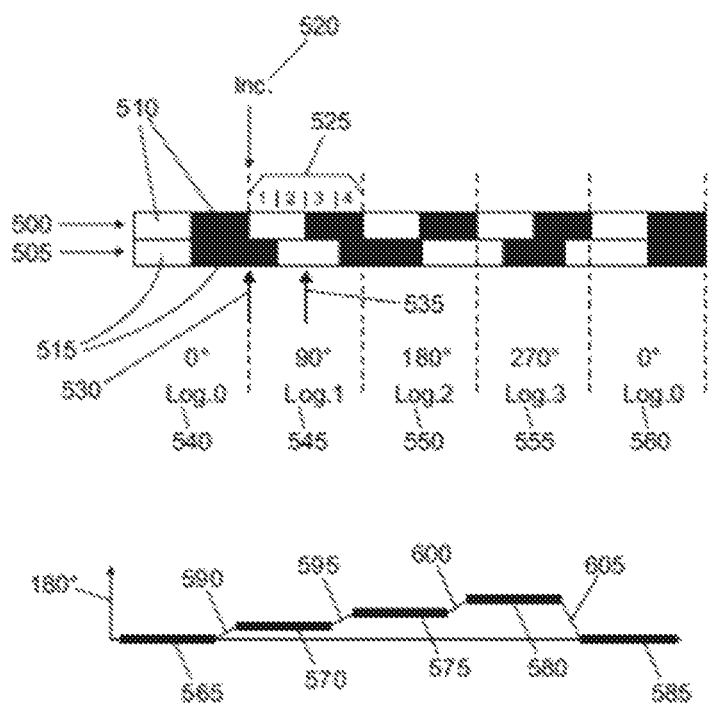
FIG. 5 shows a section corresponding to FIG. 4 of a measuring gauge formed according to the invention, to illustrate the detection according to the invention of logical values between pole pairs.

In FIG. 5, the course of the angle difference between two adjacent, different logical values 540, 545, 550, 555, 560 is indicated by a respective thin line 590, 595, 600, 605 in a measuring gauge 500, 505 with an incremental track 500 with pole pairs 510 and an absolute track 505 with pole pairs 515, in addition to the angle differences 565, 570, 575, 580 shown in turn. This transition region has to be excluded or disregarded in the evaluation of the logical values.

A corresponding approach to a solution is the use, schematically shown in FIG. 5, of two absolute sensors 530, 535 (A1, A2) for each digit, said absolute sensors being arranged to be mechanically shifted by 180°. Each of the two absolute sensors 530, 535 thus detects the phase relation to the incremental track and can be formed from two individual sensors arranged in different sites, which evaluate the amplitude, or from a sensor chip arranged at one site, said sensor chip defining the phase of a preferably two-dimensional magnetic field by two differently aligned sensors.

The increment sensor 520 additionally marked above the incremental track thus initially detects the position within a pole pair 510. Such a pole pair 510 is divided into several regions, in fact in the present case into four quadrants 525. When the increment sensor 520 is in the first quadrant '1' or in the fourth quadrant '4' of the respective pole pair, the second absolute sensor 535 (A2) has to be used for the evaluation. If, however, the increment sensor 520 is in the second quadrant '2' or in the third quadrant '3', the first absolute sensor 530 (A1) has to be used for the evaluation.

With this method, the invalid region between the pole pairs can be inexpensively though still effectively blocked out. When determining the phase position, the amplitudes are minimized during the mathematical calculation. The angle is determined by the ratio formation and by means of the arctan function.

It should be noted that the described measuring system can also be correspondingly used in numerous absolute tracks, whereby the housing length is advantageously even more greatly reduced accordingly.

The described measuring gauge or the described length measuring system and the described method for operating it, can preferably be used in a magnetic tape length measuring system with the advantages described herein. Furthermore, the device and the method however can be principally used in all rotary and linear positioning, measuring, movement speed or rotational speed monitoring. In addition, the method can not only be used with the magnetic tape length measuring system described herein or the magnetic measuring systems with said advantages, but also in all kinds of absolute measuring systems which are based on an incremental active principle, e.g. inductive, optical or capacitive measuring systems or the like. With the last mentioned. In the non-magnetic measuring systems mentioned last, the concepts and principals described herein are able to be used analogously.

What is claimed is:

1. A length or position measuring system, which has an at least locally substantially linear measuring gauge and at least one sensor head that is able to be moved relative to the measuring gauge and comprises at least one increment sensor and at least one absolute sensor,
    wherein the measuring gauge comprises an incremental track and at least one absolute track,
    wherein the incremental track and the at least one absolute track have pole pairs arranged in the longitudinal direction of the measuring gauge,
    wherein at least one pole pair of the at least one absolute track is arranged or formed phase-shifted relative to a corresponding pole pair of the incremental track, and
    wherein the transition values of the angle differences between two adjacent, different logical values are removed from the evaluation of the logical values.

2. The length or position measuring system according to claim 1, wherein the at least one absolute track provides a mixture of poles of different polarity, by means of which at least doubly incremented logical values are generated.

3. The length or position measuring system according to claim 1, wherein n different, absolute phase relations of pole pairs of the at least one absolute track are provided by said phase-shifting in relation to corresponding pole pairs of the incremental track, whereby, in comparison to pole pairs of the incremental track, relative shifts with angles differences of between 0° and 360° are formed, by means of which corresponding logical values 1, 2, etc. are formed, wherein each pole pair with a respectively associated sensor forms a digit.

4. The length or position measuring system according to claim 3, wherein $m^n$ values are able to de detected by m logical values and n sensors corresponding to respective angle differences.

5. The length or position measuring system according to claim 4, wherein n digits are connected to a total value, whereby $m^n$ values are able to be depicted.

6. The length or position measuring device according to claim 1, wherein at least two absolute sensors are provided for each pole pair of the at least one absolute track, which are arranged offset to one another, and an increment sensor is provided that detects the position within a pole pair of the incremental track, said pole pair being divided into numerous regions.

7. A method for operating a length or position measuring system which has an at least locally substantially linear measuring gauge and at least one sensor head that is able to be moved relative to the measuring gauge and comprises at least one increment sensor and at least one absolute sensor,
wherein the measuring gauge comprises an incremental track and at least one absolute track,
wherein the incremental track and the at least one absolute track have pole pairs arranged in the longitudinal direction of the measuring gauge,
wherein at least one pole pair of the at least one absolute track is arranged or formed phase-shifted relative to a corresponding pole pair of the incremental track,
wherein m logical values are detected corresponding to respective angle differences and $m^n$ values are detected by n sensors,
wherein the length or position measuring system has an increment sensor and at least two absolute sensors for each pole pair of the at least one absolute track,
wherein the at least two absolute sensors are arranged offset to one another, wherein the increment sensor detects the position within a pole pair divided into several regions of the incremental track, and
wherein, if the increment sensor is in one of the two other regions, the second of the at least two absolute sensors is provided for the evaluation.

8. The method according to claim 7, wherein n digits are connected to form a total value and thus $m^n$ values are depicted.

9. A method for operating a length or position measuring system which has an at least locally substantially linear measuring gauge and at least one sensor head that is able to be moved relative to the measuring gauge and comprises at least one increment sensor and at least one absolute sensor,
wherein the measuring gauge comprises an incremental track and at least one absolute track,
wherein the incremental track and the at least one absolute track have pole pairs arranged in the longitudinal direction of the measuring gauge,
wherein at least one pole pair of the at least one absolute track is arranged or formed phase-shifted relative to a corresponding pole pair of the incremental track,
wherein m logical values are detected corresponding to respective angle differences and $m^n$ values are detected by n sensors, and
wherein the courses of the angle differences between two adjacent, different logical values are removed from the evaluation of the logical values.

* * * * *